United States Patent
Rao et al.

(10) Patent No.: US 6,922,196 B1
(45) Date of Patent: Jul. 26, 2005

(54) PRIORITY-DRIVEN DITHER

(75) Inventors: Ravishankar Rao, White Plains, NY (US); Gerhard Robert Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,423

(22) Filed: Apr. 19, 2000

(51) Int. Cl.$^7$ ................................................. G09G 5/02
(52) U.S. Cl. ........................ 345/596; 345/599; 358/3.06
(58) Field of Search ................................. 345/596–599; 358/3.06, 1.9, 456, 3.04; 382/284, 300

(56) References Cited

U.S. PATENT DOCUMENTS

| 5,323,247 | A | * | 6/1994 | Parker et al. ................ 358/456 |
| 6,343,159 | B1 | * | 1/2002 | Cuciurean-Zapan et al. ..... 382/284 |
| 6,366,362 | B1 | * | 4/2002 | Butterfield et al. .......... 358/1.9 |
| 6,411,745 | B1 | * | 6/2002 | Tai et al. .................... 382/300 |
| 6,476,934 | B1 | * | 11/2002 | Ilbery et al. ............... 358/3.04 |

* cited by examiner

Primary Examiner—Dennis-Doon Chow
Assistant Examiner—Srilakshmi K. Kumar
(74) Attorney, Agent, or Firm—Thomas A. Beck; Louis P. Herzberg (57) ABSTRACT

The present invention presents halftoning techniques for printers and solves problems related to halftoning so as to render a combination of text and image areas in a pleasing manner. An advantage of this technique is that it gradually switches from text rendering to picture rendering in a manner which is locally adaptive over small regions, (say 3×3 pixels).

6 Claims, 6 Drawing Sheets

Neighborhood of ROI

Print "1" at positions 1,2, 3 "0" elsewhere

FIG. 6

PRIORITY-DRIVEN DITHER

FIELD OF THE INVENTION

The present invention is directed to the field of digital printing and imaging. It is more specifically directed to the reproduction of digitized documents.

BACKGROUND OF THE INVENTION

Digital documents, containing a mixture of text and pictures are proliferating. Similarly, the number of digital output devices such as digital printers are increasing. A vast majority of digital printers can print only in a bilevel mode, either ink is printed or no ink is printed. The task of converting digital documents into digital output on bilevel output devices involves a process known as halftoning. In halftoning the original continuous tone input is converted to a bilevel image. Digital halftoning is used for printing a picture (or more generally displaying a picture on some two-dimensional medium). It uses small dots with a limited number of colors such that it appears to consist of many colors when viewed at a proper distance. For example, a picture printed with black and white dots may appear to contain various shades of gray when viewed at some distance.

Commonly used methods for digital halftoning include dithering algorithms which use threshold arrays (also called dither matrices) or dither masks. A fundamental problem in halftoning is that text is generally not rendered well. Processing pictures as text or text as pictures results in poor print output quality. An example of this poor quality would be text areas erroneously printed as halftones. This results in the text looking blurred rather than sharp. It is desirable to have an algorithm that can print both picture and text areas well.

A possible solution is to segment the text and picture areas and process them separately. The composite document containing text and pictures is segmented into text and picture areas. Only the picture areas are halftoned. This technique is time consuming and error-prone in so much that the segmentation is rarely performed with total accuracy. Furthermore, when there are text areas within pictures the segmentation is not well defined.

Goertzel and Thompson (U.S. Pat. No. 4,654,721) present a technique for edge enhancement in halftones which assigns a number of pixels to print in an area and orders the pixel values in a larger area to determine where the printed pels should be placed. The Goertzel-Thompson invention is based on lower resolution input data and is not capable of reproducing the level of image detail required by many applications.

SUMMARY OF THE INVENTION

Thus an aspect of the present invention is to provide methods and apparatus that can properly print both picture and text areas using a halftoning technique based on an area-of-support. Dynamic adjustments are made depending on whether the document area contains text or pictures such that there is a smooth (visually pleasing) transition between text and picture areas.

Another aspect of the present invention is to provide a block-dither method, which involves a limited dependence on the local surround of a pixel.

Another aspect of the present invention is to provide a method which examines a digitized document, decides for each local area how much gray the printer needs to put down, and determines how these pixels are distributed spatially.

Another aspect of the present invention is to provide a method which gradually switches from text rendering to picture rendering in a manner that is locally adaptive over small regions.

Another aspect of the present invention is to provide a computationally fast method which does not rely on previously used segmentation techniques which are error prone.

BRIEF DESCRIPTION OF THE DRAWINGS

The foregoing and other aspects and advantages will be better understood from the following detailed description of embodiments of the invention with reference to the drawings, in which.

DESCRIPTION OF THE INVENTION

Halftone algorithms are either point operations (such as dither) or sequential operations (such as error diffusion). The current invention provides a block-dither method, which involves a limited dependence on the local surround of a pixel. An example embodiment of the present invention examines a digitized document, and decides for each local area (say a 3×3 window or even 1×2) how much gray the printer needs to put down. This determines the number of pixels to be turned on, based on a calibration table. Then a decision is made as to how these pixels are distributed spatially.

Consider a case in which M pixels are to be printed. In this case M pixels are to be turned "on" with ink. A stack is constructed which is initialized to the position sequence of the gray values in a given 3×3 dither matrix. This stack serves to prioritize the different pixels that could be printed in the 3×3 window. The gray values in the 3×3 window are conditionally sorted, as explained below, and the M black values are assigned to the resulting lowest M gray levels. In this way, a uniform gray level area is printed as a predetermined halftone pattern. The input data dictates the number of pixels to be turned "on". In an embodiment, the positions of the lowest gray values (darkest pixels) in the input image are allowed to override the default sort order in the stack. This achieves a smooth transition between halftones and text. This results in better localization of features, in that the printed pixel matches the features in the input image that deserve the most ink. When a pixel in the image calls for a pixel of ink, the method generates this ink pixel at the correct location. This is advantageous to other halftoning schemes such as error diffusion which cannot provide this feature localization. A used herein a pixel value is the value of that pixel's intensity or brightness.

Figure 1:
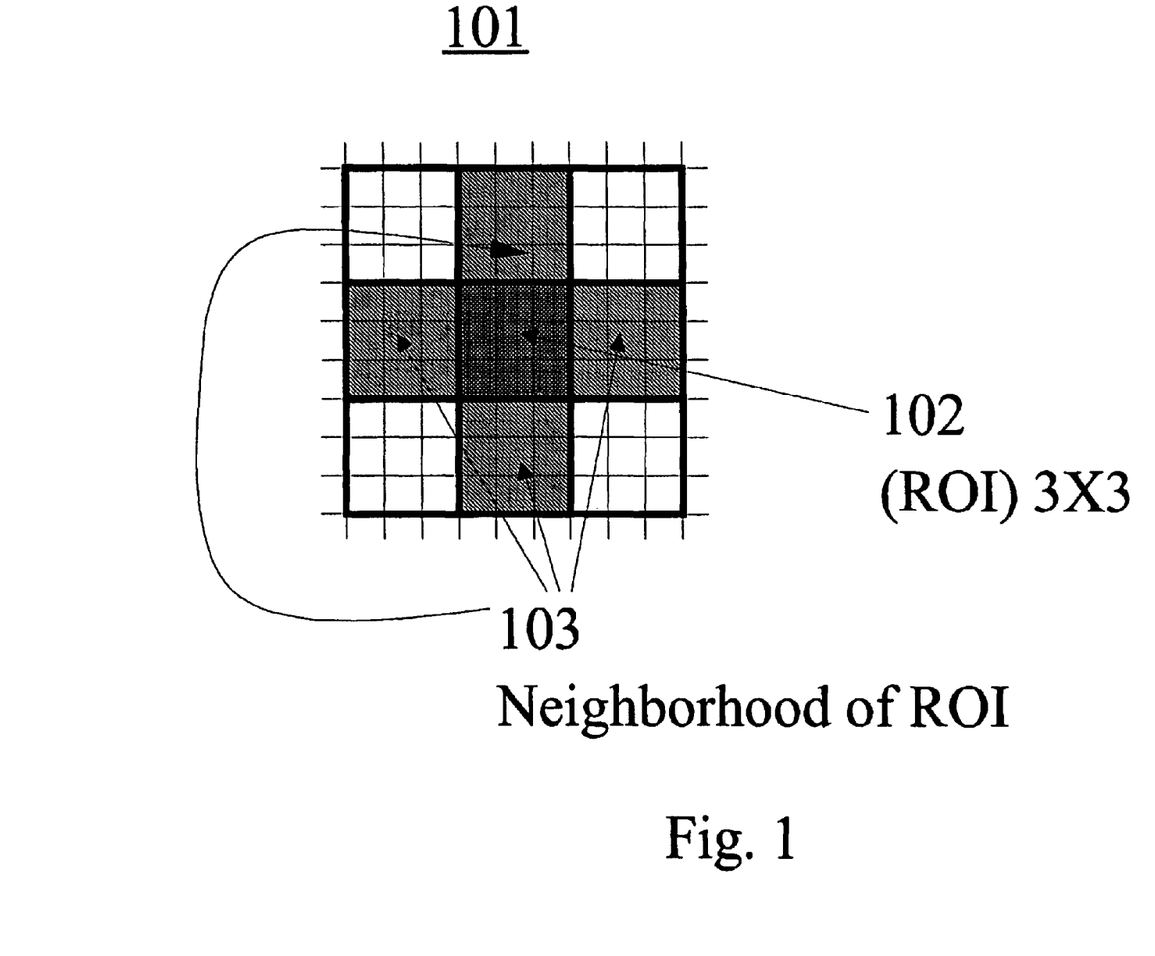
FIG. 1, shows an example of how the image is divided into a local region of interest (ROI) and its neighborhood in accordance with the present invention.

FIG. 1, shows an example embodiment of how an image is divided into a local region of interest (ROI) and its neighborhood. The computations for a given pixel are based on the ROI and its neighborhood. In FIG. 1 a region of interest ROI, 102, is chosen from the input image, 101. The region in this case is shown to be a 3×3 window. Other window sizes up to or more than 128×128 are used in accordance with the particular application and/or number of pixels in a text character and/or image part. In general the window can have any shape. It is advantageous to choose a regular shape such as a rectangle or a circle to keep the size of the window sufficiently small in order to capture local variations rather than global variations. The neighborhood of the ROI, 103, includes the additional image pixels from which we obtain statistics. The image pixel values within the ROI are transformed to binary values and placed in corresponding positions in the output image according to the method described in FIGS. 2 and 3. The entire image is covered by tiling the ROIs so that adjacent ROIs don't overlap. For instance, in FIG. 1, ROI 102 is shifted by 3 pixels to the right for the next iteration. Since the computations for each ROI are independent of the computations for any other ROIs, these operations can be carried out in parallel or in any sequence.

In the following discussion, a high dynamic range is said to occur when the difference between the highest and lowest intensity values is high, such from 150 to 240 (out of a 0 to 255 range for 8 bit pixel values). A medium dynamic range is said to occur when the difference between the highest and lowest intensity values is medium, such as from 50 to 149. A low dynamic range is said to occur when the difference between the highest and lowest intensity values is low, such as from 15 to 49. Values outside these ranges are either very low or very high.

Example embodiments are given for four cases. These cases consider different dynamic ranges of image intensity values in the ROI and it's neighborhood. Those familiar with the art will realize that the concepts of the present invention are applicable to other cases and combinations.

A first case occurs when the image intensity values vary over a high dynamic range. This typically occurs in text areas which show large transitions between black and white regions. Hence, a large difference between the minimum and maximum values in the ROI and it's neighborhood is useful to indicate the presence of text areas or very coarse halftones. In these regions it is advantageous to use a first halftoning rule to compute a dynamic threshold and apply it to the ROI. This thresholding operation generally renders text areas in a pleasing manner. It is superior to straight forward halftoning of these text areas which would cause these text areas to appear blurred.

A second case to consider is when the image intensity values vary over a low dynamic range. This is typical for continuous tone gray areas which contain slowly varying image intensities. In this situation, it is advantageous to use a second halftoning rule for the rendering method, which is to apply halftoning using a dither matrix. This permits the gradual shift of the application of this method to medium dynamic range areas.

A third case occurs when the image intensity values vary over a medium dynamic range. If the dynamic range is not clearly high or low, either of the above rendering methods is not perfect. In this case a third halftoning rule is employed to use a mixed procedure. In the third halftoning rule the halftone procedure is modified by first placing the printed pels in the darkest areas of the ROI. The remaining printed pels are placed according to the dither matrix. In general, a convention is used such that a printed pel of "1" represents ink, corresponding to dark areas. A printed pel of "0" represents no ink, corresponding to light areas.

A fourth case occurs when all the image intensity values are either very high or very low. In this case a fourth halftoning rule is used such that all "0"s are printed at the very high intensity values or all "1"s are printed at very low intensity values.

Application of the halftoning rules is dependent upon the particular case determined by examination of the intensity values of each ROI and its particular neighborhood. The computation carried out for each position of the ROI is described with references to FIGS. 2 and 3. A next (or first) ROI is chosen 201. We first compute the minimum, (min) and maximum, (max.) pixel values in the ROI and it's neighborhood 202. A determination is made as to whether the fourth halftoning rule applies 203. If the minimum pixel value is very high (as defined by the user for example) or if the maximum pixel value is very low, then we apply the fourth halftoning rule 204 and proceed to the next ROI.

Figure 2:
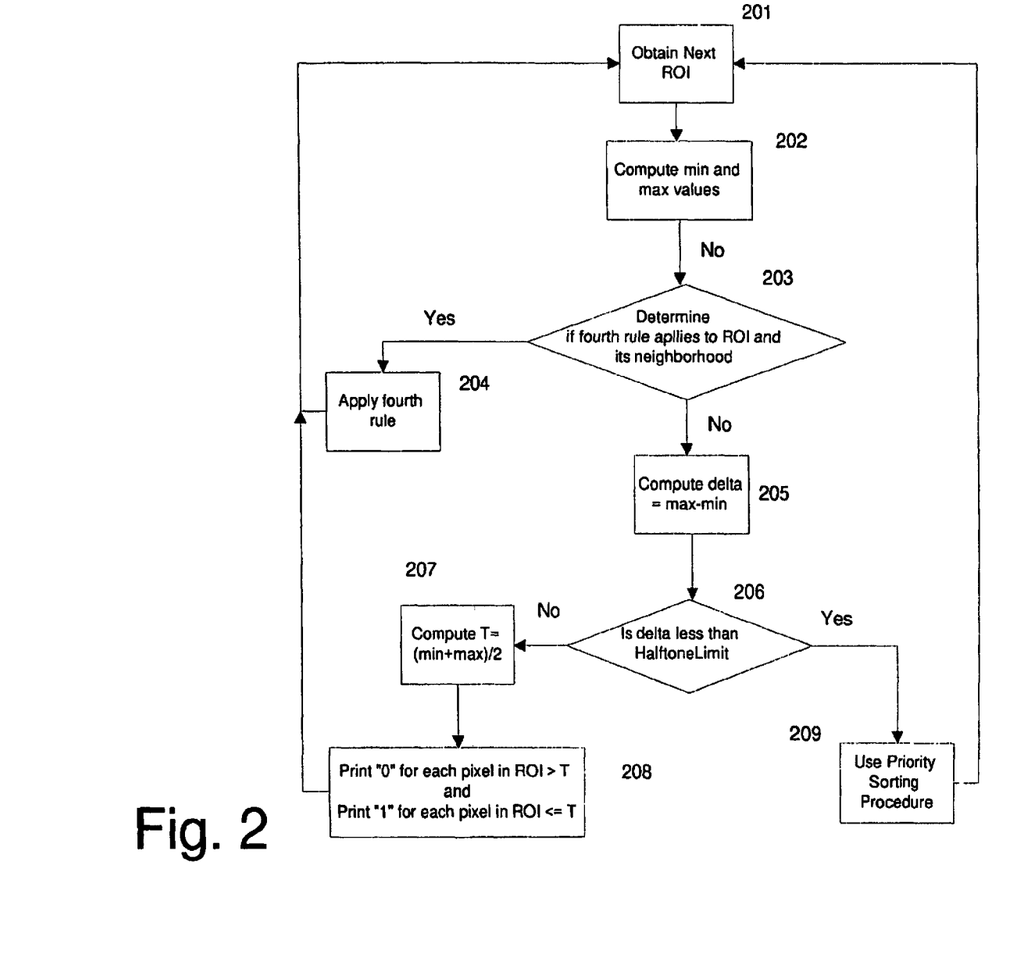
FIG. 2 shows an example of a flow chart of the sequence of decisions and computations made in halftoning in accordance with the present invention.

If the fourth rule does not apply, we compute the difference delta between the max and min values 205. We determine if delta is less than a predetermined value, HalftoneLimit206. If no, compute the threshold of the pixels 'T' within the ROI 207. The threshold, T, is the average of the min and max values. If the graylevel of a pixel within ROI is greater than T we print a "0". Otherwise we print a "1" 208 and obtain a next ROI 201. The HalftoneLimit is defined as the lower limit of the high dynamic range, i.e. 150 for the examples given above.

Figure 3:
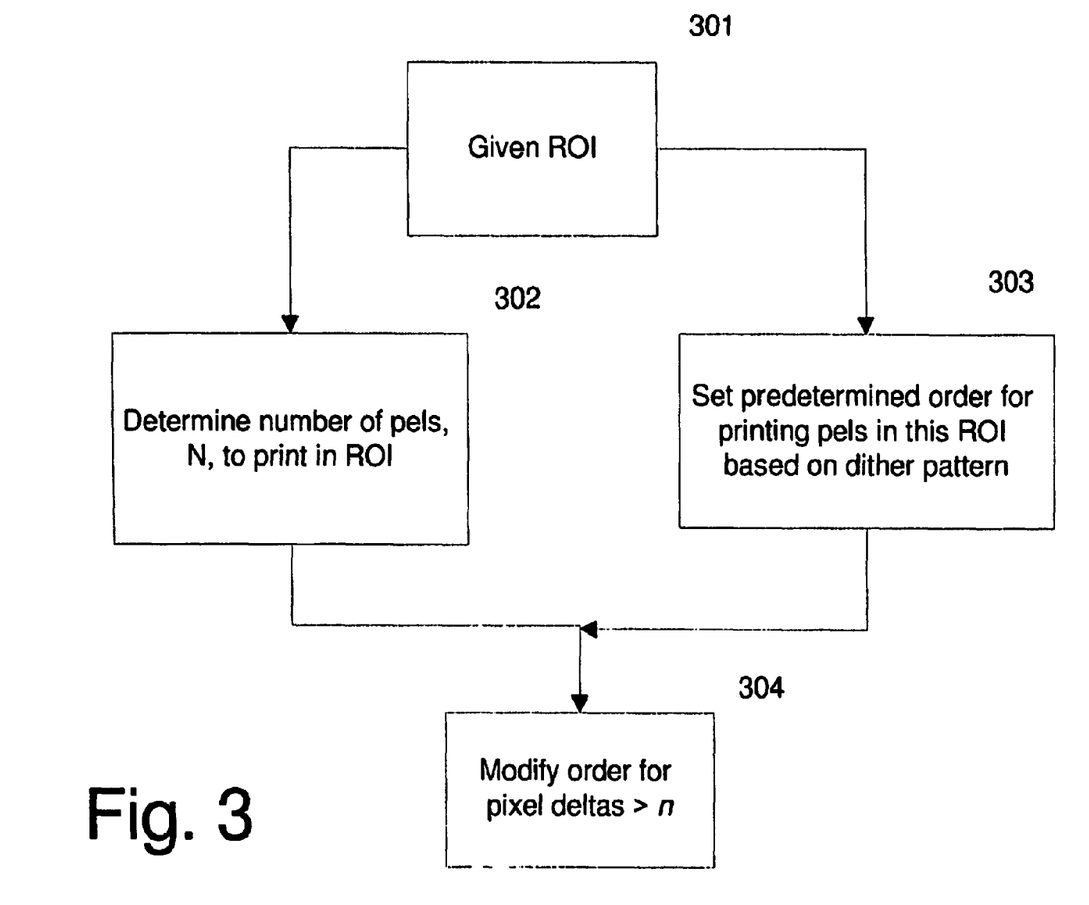
FIG. 3 gives a detailed description of a priority driven dither computation box in accordance with the present invention.

If delta is less than the HalftoneLimit we use a priority driven dither method 209 and obtain a next ROI if any 201. FIG. 3 shows an example of a priority driven dither method. The first step in the dither method is to determine the number of pels, N, to print in the ROI 302 for the given ROI 301. This may be done in any number of ways. One example embodiment takes the average gray value within the ROI and uses a lookup table to obtain N from this average. A parallel step is to set a predetermined order for printing pels in this ROI based on some given dither matrix 303. It is assumed that we have a large dither matrix of a size greater than the ROI. The location of the ROI within the original image determines the subset of the dither matrix which is used. This is performed using the standard tiling operation performed in conventional halftoning known to those familiar with the art. The next step is to conditionally sort the pixels in the ROI based on their pixel values 304. Conditional sorting is explained below.

Figure 4:
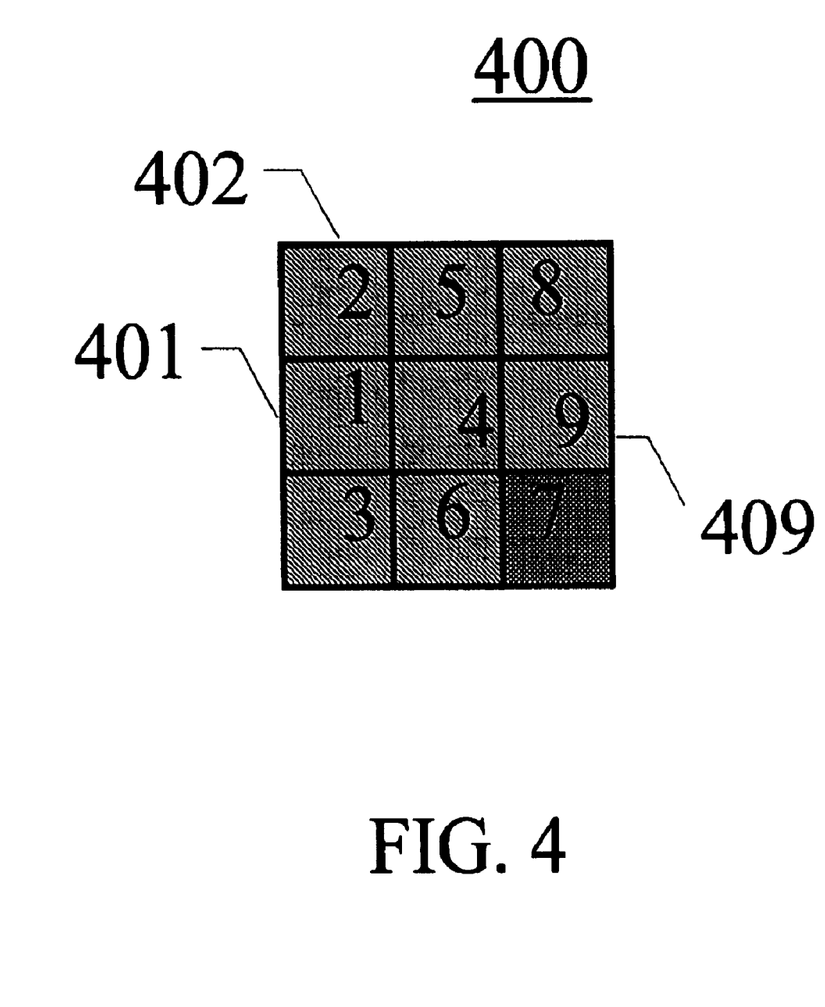
FIG. 4 depicts an example of an initial sequence for printing pels within an ROI based upon a dither matrix.
Figure 5:
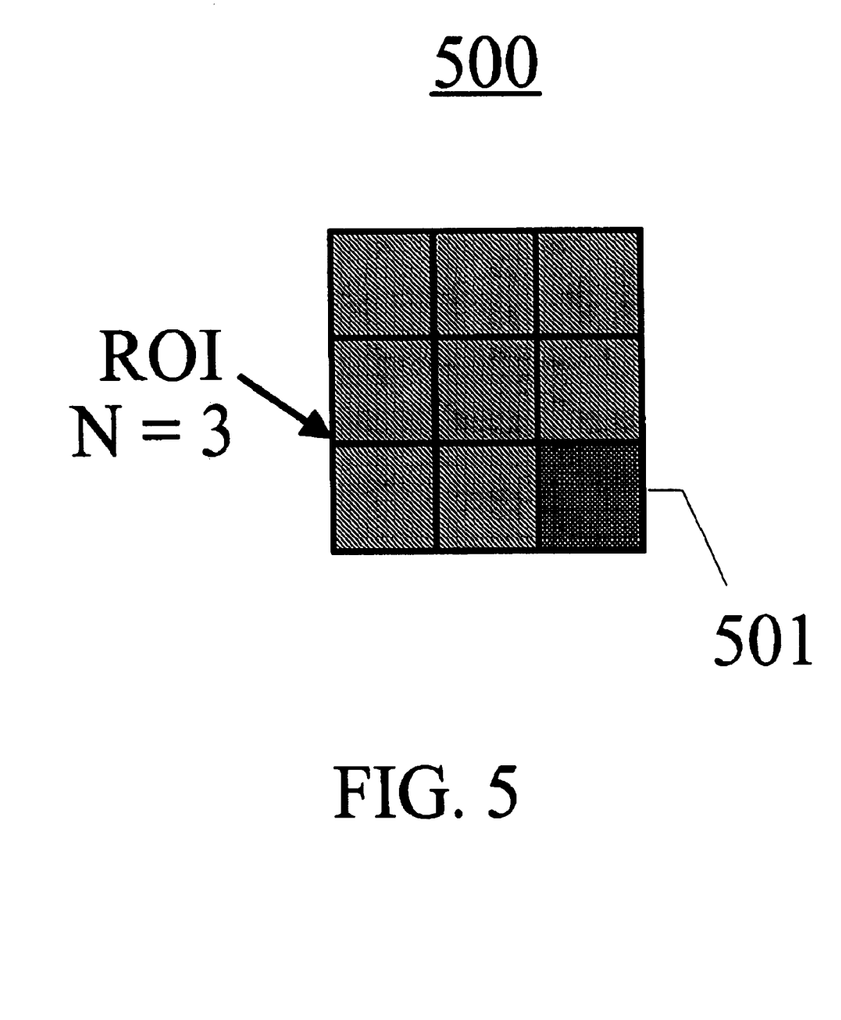
FIG. 5 depicts the second step in determining the sequence of pixels.
Figure 6:
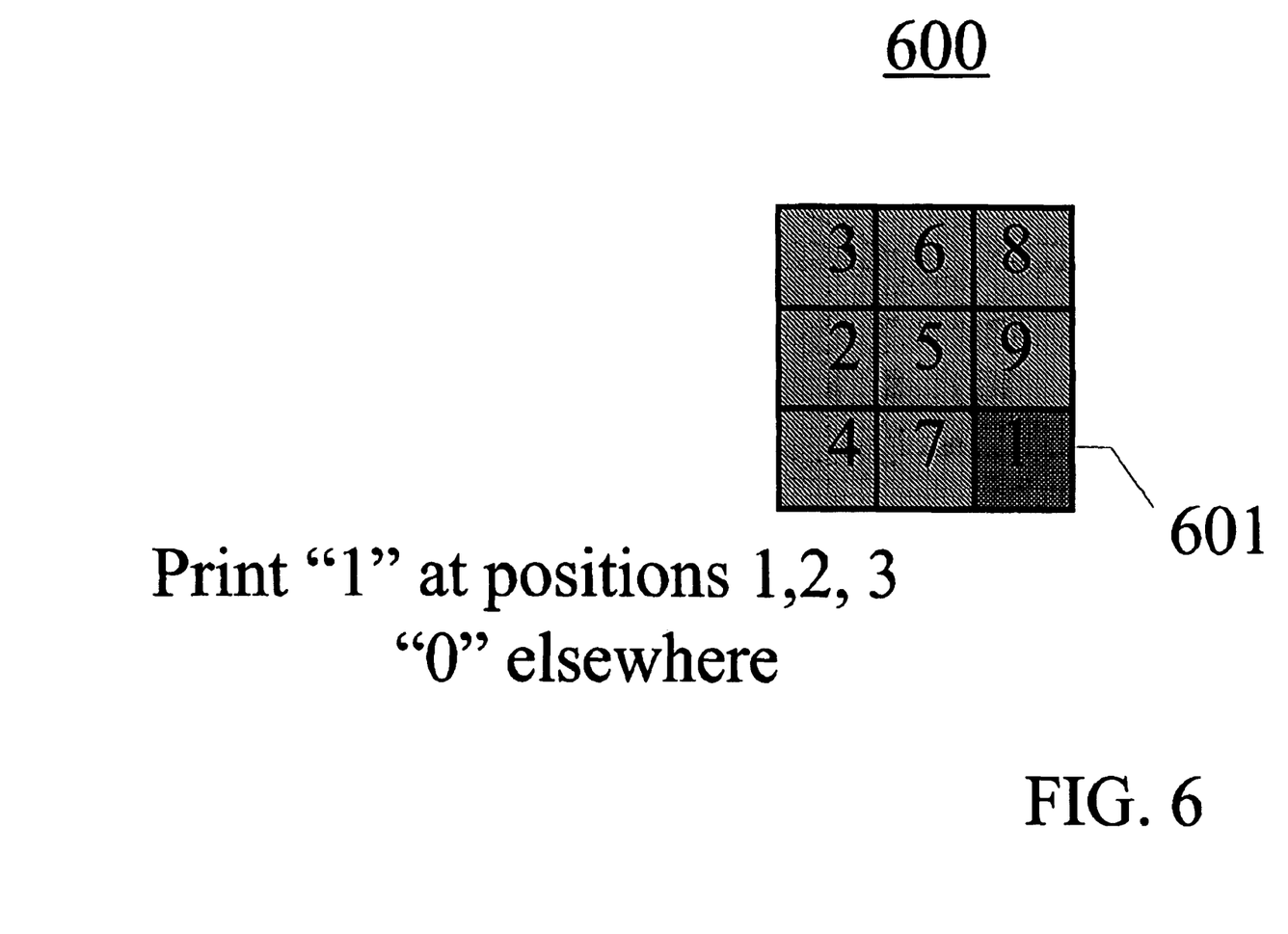
FIG. 6 depicts the final step in determining the sequence of pixels.

FIG. 4 shows an example of an initial sequence for printing pels within an ROI 400 based on some dither matrix. Assuming a uniform gray area, "1" represents the first pixel to be printed 401, "2" represents the second pixel 402, and so on until "9" represents the last pixel 409 of the 3×3 ROI to be printed. In accordance with the present invention, this initial sequence is modified depending on the data present within the ROI. Assume the ROI has an image 500 as shown in FIG. 5. The image 500 shows a dark pixel in the lower right corner 501. The initial sequence 400 is processed through a sorting technique to produce a final sequence 600 shown in FIG. 6. Note that the dark pixel 601 in the lower right corner is now printed first and subsequent entries maintain their otherwise relative sequence order.

A sorting technique in accordance with the present invention is described as follows. In all sorting we start with some initial ordering of the items to be sorted. In a conventional sorting technique, such as in a bubble sort, two adjacent items are swapped if one is greater than the other. In the present technique the same two adjacent items are swapped only if one is greater than the other by a prespecified amount, n, as shown in 304. When items are not swapped, the original relative order is maintained. In this way, only significant differences in item values result in reordering of the original sequence.

In situations where the ordering of the image intensity values differ significantly from the ordering of the dither matrix, a complete reordering generally occurs. In these cases pels are printed only where the pixels are darkest. This is equivalent to a threshold operation and is such as to provide a smooth transition between a first case, high dynamic range, and a third case, medium dynamic range. This operation directs ink to those pixels that are the darkest such that it closely follows details in the image.

In situations where most of pixel values are the same with only a few exceptions, the initial printing sequence will be changed only slightly. This provides a smooth transition between a third case, medium dynamic range, and a second case, low dynamic range.

It is noted that the current invention differs from the method of Goertzel and Thompson (U.S. Pat. No. 4,654, 721) in a number of ways. In Goertzel and Thompson, the image goes through a scaling operation, such that 9 pels are printed for each input pixel. Therefore the pattern of the 9 pel area is determined by the ordering of pixels in a larger 9 pixel area. Furthermore, this was only done when a gradient criterion was exceeded. In contradistinction the present invention does not use the pattern derived from a larger area to determine the pels printed in a smaller area. Also, in the present invention, the ordering scheme is very different in that a pre-assigned (priority) order is chosen. The order is changed only if the difference in pixel values exceeds some threshold value. The Goertzel-Thompson invention was generally based on lower resolution input data and is thus not capable of reproducing the level of image detail reproduced with the method of the present invention.

It is noted that the present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications.

It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for transforming a digitized image, said method comprising: providing said image as a plurality of pixels, wherein data for each pixel is in a first format which is a grey scale image; and processing said data of each of said pixels by employing data from a region of interest which includes at least one pixel following said each of said pixels, and includes a plurality of neighboring pixels, and producing a second format which is a binary image, and said method further comprising determining a dynamic range of pixel values of pixels in an encompassing neighborhood of the region of interest, and wherein the step of processing includes making dynamic adjustments depending on the dynamic range of pixel values, wherein the step of making said dynamic adjustments includes producing a visually pleasing transition between text and picture areas in said image;

and wherein said producing a visually pleasing transition includes:

if said dynamic range is high, implying said pixels in said encompassing neighborhood of said region of interest are in a text area or a line art area or in an area of an image that has a high contrast edge, wherein the edges of said text area, line art area and area of an image having high contrast edge are sharpened by computing a pixel data threshold value for said region of interest;

and comparing each pixel value in said region of interest to said pixel data threshold;

if said pixel value is greater than the pixel data threshold value, a first value is placed in the corresponding position of the said second format image;

if said pixel value is less than or equal to the pixel data threshold value, a second value is placed in the corresponding position of the said second format image;

if said dynamic range is medium, computing a desired number of second values to be placed in said second format image in the region of interest;

ordering the pixels in the region of interest according to the ordering of a predetermined halftone array;

altering the order of a pixel in said ordering if said pixel has a value which is greater than the value of the next pixel in said order by a predetermined reordering threshold value;

repeating said altering of the pixel order until the first and second values chosen for the second format image are no longer changed;

choosing said desired number of second values for the second format from the beginning of the said order, and assigning the remaining pixels values in the region of interest to said first value;

if said dynamic range is low, using said predetermined halftone array to compute said first and second values for said second format image.

2. The method as in claim 1 where a number of second value is determined, said number to be placed in said second format grey scale image based on a weighted function of the image intensity values within the region of interest of said first format image.

3. The method as in claim 2 wherein said plurality of regions-of-interest form the entire said first grey scale format.

4. An article of manufacture comprising a computer usable medium having computer readable program code means embodied therein for causing a digital image to be transformed, the computer readable program code means in said article of manufacture comprising computer readable program code means for causing a computer to effect the steps of:

providing said image as a plurality of pixels, wherein data for each pixel is in a first format which is a grey scale image; and processing said data of each of said pixels by employing data from a region of interest which includes at least one pixel following said each of said pixels, and includes a plurality of neighboring pixels, and producing a second format which is a binary image, and said method further comprising determining a dynamic range of pixel values of pixels in an encompassing neighborhood of the region of interest, and wherein the step of processing includes making dynamic adjustments depending on the dynamic range of pixel values, wherein the step of making said dynamic adjustments includes producing a visually pleasing transition between text and picture areas in said image;

and wherein said producing a visually pleasing transition includes:

if said dynamic range is high, implying said pixels in said encompassing neighborhood of said region of interest are in a text area or a line art area or in an area of an image that has a high contrast edge, wherein the edges of said text area, line art area and area of an image having high contrast edge are sharpened by computing a pixel data threshold value for said region of interest;

and comparing each pixel value in said region of interest to said pixel data threshold;

if said pixel value is greater than the pixel data threshold value, a first value is placed in the corresponding position of the said second format image;

if said pixel value is less than or equal to the pixel data threshold value, a second value is placed in the corresponding position of the said second format image;

if said dynamic range is medium, computing a desired number of second values to be placed in said second format image in the region of interest;

ordering the pixels in the region of interest according to the ordering of a predetermined halftone array;

altering the order of a pixel in said ordering if said pixel has a value which is greater than the value of the next pixel in said order by a predetermined reordering threshold value;

repeating said altering of the pixel order until the first and second values chosen for the second format image are no longer changed;

choosing said desired number of second values for the second format from the beginning of the said order, and assigning the remaining pixels values in the region of interest to said first value;

if said dynamic range is low, using said predetermined halftone array to compute said first and second values for said second format image.

5. A program storage device readable by machine, tangibly embodying the program of instructions executable by the machine to perform method steps for transforming a digitized image, said method steps comprising the steps of:

providing said image as a plurality of pixels, wherein data for each pixel is in a first format which is a grey scale image; and processing said data of each of said pixels by employing data from a region of interest which includes at least one pixel following said each of said pixels, and includes a plurality of neighboring pixels, and producing a second format which is a binary image, and said method further comprising determining a dynamic range of pixel values of pixels in an encompassing neighborhood of the region of interest, and wherein the step of processing includes making dynamic adjustments depending on the dynamic range of pixel values, wherein the step of making said dynamic adjustments includes producing a visually pleasing transition between text and picture areas in said image;

and wherein said producing a visually pleasing transition includes:

if said dynamic range is high, implying said pixels in said encompassing neighborhood of said region of interest are in a text area or a line art area or in an area of an image that has a high contrast edge, wherein the edges of said text area, line art area and area of an image having high contrast edge are sharpened by computing a pixel data threshold value for said region of interest;

and comparing each pixel value in said region of interest to said pixel data threshold;

if said pixel value is greater than the pixel data threshold value, a first value is placed in the corresponding position of the said second format image;

if said pixel value is less than or equal to the pixel data threshold value, a second value is placed in the corresponding position of the said second format image;

if said dynamic range is medium, computing a desired number of second values to be placed in said second format image in the region of interest;

ordering the pixels in the region of interest according to the ordering of a predetermined halftone array;

altering the order of a pixel in said ordering if said pixel has a value which is greater than the value of the next pixel in said order by a predetermined reordering threshold value;

repeating said altering of the pixel order until the first and second values chosen for the second format image are no longer changed;

choosing said desired number of second values for the second format from the beginning of the said order, and assigning the remaining pixels values in the region of interest to said first value;

if said dynamic range is low, using said predetermined halftone array to compute said first and second values for said second format image.

6. An article of manufacture comprising a computer usable medium having computer readable program means embodied therein for causing processing at least a portion of an image, the computer readable program code means in said article of manufacture comprising computer readable code means for causing a computer to effect the steps:

providing said image as a plurality of pixels, wherein data for each pixel is in a first format which is a grey scale image; and processing said data of each of said pixels by employing data from a region of interest which includes at least one pixel following said each of said pixels, and includes a plurality of neighboring pixels, and producing a second format which is a binary image, and said method further comprising determining a dynamic range of pixel values of pixels in an encompassing neighborhood of the region of interest, and wherein the step of processing includes making dynamic adjustments depending on the dynamic range of pixel values, wherein the step of making said dynamic adjustments includes producing a visually pleasing transition between text and picture areas in said image;

and wherein said producing a visually pleasing transition includes:

if said dynamic range is high, implying said pixels in said encompassing neighborhood of said region of interest are in a text area or a line art area or in an area of an image that has a high contrast edge, wherein the edges of said text area, line art area and area of an image having high contrast edge are sharpened by computing a pixel data threshold value for said region of interest;

and comparing each pixel value in said region of interest to said pixel data threshold;

if said pixel value is greater than the pixel data threshold value, a first value is placed in the corresponding position of the said second format image;

if said pixel value is less than or equal to the pixel data threshold value, a second value is placed in the corresponding position of the said second format image;

if said dynamic range is medium, computing a desired number of second values to be placed in said second format image in the region of interest;

ordering the pixels in the region of interest according to the ordering of a predetermined halftone array;

altering the order of a pixel in said ordering if said pixel has a value which is greater than the value of the next pixel in said order by a predetermined reordering threshold value;

repeating said altering of the pixel order until the first and second values chosen for the second format image are no longer changed;

choosing said desired number of second values for the second format from the beginning of the said order, and assigning the remaining pixels values in the region of interest to said first value;

if said dynamic range is low, using said predetermined halftone array to compute said first and second values for said second format image.

* * * * *